(12) United States Patent
Burgio et al.

(10) Patent No.: US 12,088,489 B2
(45) Date of Patent: Sep. 10, 2024

(54) PERFORMANCE MEASUREMENT IN A PACKET-SWITCHED COMMUNICATION NETWORK

(71) Applicant: TELECOM ITALIA S.p.A., Milan (IT)

(72) Inventors: Francesco Burgio, Turin (IT); Luca Maria Castaldelli, Turin (IT); Angelo Franceschini, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 362 days.

(21) Appl. No.: 16/066,444

(22) PCT Filed: Dec. 30, 2015

(86) PCT No.: PCT/EP2015/081454
§ 371 (c)(1),
(2) Date: Jun. 27, 2018

(87) PCT Pub. No.: WO2017/114580
PCT Pub. Date: Jul. 6, 2017

(65) Prior Publication Data
US 2019/0014029 A1 Jan. 10, 2019

(51) Int. Cl.
*H04L 43/50* (2022.01)
*H04L 43/026* (2022.01)
(Continued)

(52) U.S. Cl.
CPC ............ *H04L 43/50* (2013.01); *H04L 43/026* (2013.01); *H04L 43/028* (2013.01);
(Continued)

(58) Field of Classification Search
USPC ......................................................... 370/250
See application file for complete search history.

(56) References Cited

U.S. PATENT DOCUMENTS 5,477,531 A * 12/1995 McKee .................... H04L 1/243
370/249
6,363,056 B1 * 3/2002 Beigi ...................... H04L 41/12
370/252
(Continued)

FOREIGN PATENT DOCUMENTS

EP 2 374 241 B1 8/2012
EP 2 636 185 B1 7/2014
(Continued)

OTHER PUBLICATIONS

International Search Report issued Oct. 5, 2016 in PCT/EP2015/081454 filed Dec. 30, 2015.
(Continued)

*Primary Examiner* — Gary Mu
*Assistant Examiner* — Hooman Houshmand
(74) *Attorney, Agent, or Firm* — Oblon, McClelland, Maier & Neustadt, L.L.P.

(57) ABSTRACT

A method for performance measurement in packet switched communication networks. The method includes generating a flow of artificial packets, which is then aggregated to the packet flow to be measured by an aggregator. The artificial packets are configured to follow the packet flow to be measured, starting from the point where aggregation is performed. Two measurement points are then provided after the aggregator, which provide respective raw performance measurements indicative of actual positions of the artificial packets in the aggregated packet flow. The raw performance measurements are then used for providing the performance measurements. Since all the raw performance measurements are generated after the aggregator, the measurement results are accurate without need to precisely insert the artificial packets at predetermined positions of the packet flow to be measured.

16 Claims, 6 Drawing Sheets

(51) Int. Cl.
*H04L 43/028* (2022.01)
*H04L 43/0829* (2022.01)
*H04L 43/0852* (2022.01)
*H04L 43/087* (2022.01)
*H04L 43/0888* (2022.01)

(52) U.S. Cl.
CPC ...... *H04L 43/0835* (2013.01); *H04L 43/0858* (2013.01); *H04L 43/087* (2013.01); *H04L 43/0888* (2013.01); *Y02D 30/50* (2020.08)

(56) References Cited

U.S. PATENT DOCUMENTS

| | | | |
|---|---|---|---|
| 8,730,821 B2* | 5/2014 | Song | H04L 43/0829 370/241.1 |
| 9,438,497 B2* | 9/2016 | Chan | H04L 43/026 |
| 9,699,062 B2* | 7/2017 | Cociglio | H04L 43/0852 |
| 2006/0209684 A1* | 9/2006 | Bei | H04L 1/1867 370/229 |
| 2007/0133432 A1* | 6/2007 | De Noia | H04L 43/065 370/253 |
| 2007/0195707 A1 | 8/2007 | Cidon et al. | |
| 2008/0137540 A1* | 6/2008 | Botvich | H04L 43/12 370/241 |
| 2011/0188380 A1 | 8/2011 | Song et al. | |
| 2011/0255440 A1* | 10/2011 | Cociglio | H04L 43/0835 370/253 |
| 2014/0119231 A1* | 5/2014 | Chan | H04L 43/028 370/253 |
| 2014/0313927 A1 | 10/2014 | Xue et al. | |
| 2014/0328206 A1* | 11/2014 | Chan | H04L 43/026 370/253 |
| 2015/0109953 A1* | 4/2015 | Cociglio | H04L 43/02 370/253 |
| 2016/0105353 A1* | 4/2016 | Cociglio | H04L 43/50 370/252 |
| 2016/0218839 A1* | 7/2016 | Lanzone | H04L 5/005 |
| 2017/0244623 A1* | 8/2017 | Cociglio | H04L 43/022 |
| 2018/0014214 A1* | 1/2018 | Arena | H04L 43/12 |

FOREIGN PATENT DOCUMENTS

| | | |
|---|---|---|
| EP | 2 768 187 A1 | 8/2014 |
| EP | 2 520 059 B1 | 11/2014 |
| EP | 2 802 103 A1 | 11/2014 |

OTHER PUBLICATIONS

Recommendation G.8013/Y.1731, ITU-T, Jul. 2011, pp. 26-32.
European Office Action issued on May 27, 2019 in Patent Application No. 15 817 923.4, 4 pages.

* cited by examiner

PERFORMANCE MEASUREMENT IN A PACKET-SWITCHED COMMUNICATION NETWORK

TECHNICAL FIELD

The present invention relates to the field of communication networks. In particular, the present invention relates to a method and system for performing a performance measurement in a packet-switched communication network.

BACKGROUND ART

In a packet-switched communication network, data are transmitted in the form of packets that are routed from a source node to a destination node through possible intermediate nodes. Exemplary packet-switched networks are IP (Internet Protocol) networks, Ethernet networks and MPLS (Multi-Protocol Label Switching) networks.

Packets not always reach the destination node, i.e. they may be lost during transmission through the network. Loss of packets is due to different reasons. For instance, a node or link may fail, or packets may be discarded by a node due to a congestion of its ports. Besides, packets may be discarded by a node since they contain bit errors.

Further, a packet is transmitted at a transmission time by the source node and is received at a reception time by the destination node. The time elapsing between transmission time and reception time is typically called "one-way delay". The one-way delay of a packet mainly depends on the number of possible intermediate nodes crossed by the packet from source to destination, the permanence time of the packet at each node and the propagation time along the links. Since the packets are routed hop-by-hop by each node, both the number of possible intermediate nodes crossed by packets and the permanence time of packets at each node are unpredictable. Accordingly, the one-way delay of a packet is almost unpredictable.

Besides, packets of a same packet flow may have different one-way delays, namely there are subjected to a certain "interarrival jitter" (or, briefly, "jitter"). The jitter may be calculated, for example, as the difference between the one-way delays of two packets of a same data flow.

When a communication service (in particular, a real-time voice or data service such as call, conference call, video conference, etc.) is provided by means of a packet-switched network, a measurement of packet loss, one-way delay and jitter affecting the packet flow carrying the service provides an indication of the quality of service (QoS) perceived by the end users of the service. Therefore, measuring packet loss, one-way delay and/or jitter of packet flows in a communication network is of particular interest for network operators.

ITU-T G.8013/Y.1731 (07/211), par. 8.1-8.2 (pages 26-32) describes a frame loss measurement and a frame delay measurement making use of OAM (Operation Administration Maintenance) frames injected in the flow of frames to be measured.

U.S. Pat. No. 8,730,821 discloses a packet loss detection method which provides for transmitting data packets and OAM packets, writing a counting value of data packets transmitted between two OAM packets into a subsequent OAM packet after a time delay, counting the number of data packets received between two OAM packets and calculating the packet loss rate based on the number of practically received data packets and the counting value carried by the subsequent OAM packet.

Besides, EP2374241, EP2520059 and EP2636185 in the name of the same Applicant disclose methods for measuring packet loss and/or delay and/or jitter, wherein the packets of the packet flow to be measured are marked so as to divide the packet flow into blocks of packets having a first marking value which alternate in time with blocks of packets having a second marking value. Counters and timestamps relating to each block are updated or generated at two measurement points for providing packet loss measurements and/or delay measurements and/or jitter measurements.

SUMMARY OF THE INVENTION

The Applicant has noticed that the above cited known methods described by ITU-T G.8013/Y.1731 and U.S. Pat. No. 8,730,821 provide accurate measurement results if the OAM packets are precisely inserted into predefined positions of the packet flow to be measured. Specifically, each OAM packet shall be transmitted upon lapse of a predefined transmission period or after a predefined number of data packets have been transmitted since transmission of the last OAM packet. However, since the SW/HW resources of a network element available for the insertion of the OAM packets are typically limited, an unpredictable mismatch may exist between the predefined positions at which the OAM packets shall be inserted and their actual positions into the packet flow (typically, the actual positions of the OAM packets are delayed relative to the desired predefined positions). This limits the accuracy of the measurement results provided by those known methods.

In the other hand, the methods described by EP2374241, EP2520059 and EP2636185 require marking the packets of the packet flow to be measured. However, the marking functionality may be not implementable at every network element.

In view of the above, the Applicant has tackled the problem of providing a method for performing a performance measurement on a packet flow transmitted in a packet-switched communication network which overcomes the aforesaid drawbacks, namely which does not require any modification of the content of data packets carrying user traffic and does not require the precise insertion of artificial packets at predefined positions of the packet flow in order to provide accurate measurement results.

In the following description and in the claims, the expression "performing a performance measurement on a packet flow" will designate an operation of measuring:
- a one-way delay, a two-way delay or a jitter induced on packets of said packet flow by transmission between the two measurement points; and/or
- a packet loss induced on packets of said packet flow by transmission between the two measurement points.

Further, in the present description and in the claims, the expression "artificial packet" will designate a packet generated and injected into the communication network by one or more devices controlled by the network manager, at the specific purpose of implementing a performance measurement. Artificial packets therefore do not carry any user traffic, and their content (namely, the content of their header and payload) and well as their transmission rate is controlled by the network manager. On the contrary, in the description and in the claims, the expression "data packet" will designate a packet carrying user traffic, the generation and transmission of data packets being in charge to network users, not to the network manager. Both the content and the transmission rate of such data packets are therefore not under the control of the network manager.

According to embodiments of the present invention, the performance of a packet flow are measured by providing an artificial packet generator which generates a flow of artificial packets and a packet aggregator that, at a node located on the path of the packet flow to be measured, aggregates the artificial packets with the packet flow to be measured into an aggregated packet flow. The artificial packets are configured to follow at least a length of the path of the packet flow to be measured, following to the node wherein aggregation is carried out. At least two measurement points are also provided on the path length followed by the artificial packets aggregated with the packet flow to be measured, which provide respective raw performance measurements indicative of the actual positions of the artificial packets in the aggregated packet flow. The raw performance measurements are then used for providing performance measurement on the packet flow to be measured.

Since all the raw performance measurements are provided by measurement points located after the aggregator and are accordingly indicative of the actual positions of the artificial packets into the aggregated packet flow, the measurement results are advantageously accurate without the need to precisely insert the artificial packets at predetermined positions of the packet flow to be measured. Even if the aggregator introduces an unpredictable delay between the time at which an artificial packet is received from the artificial packet generator and the time at which this artificial packet is actually inserted in the packet flow to be measured, the measurement results are advantageously accurate, since all the raw performance measurements take into account such unpredictable delay. Accurate measurement results are therefore obtained even when the SW/HW resources available at the node at which aggregation is performed are limited. Besides, no marking of the data packets of the packet flow to be measured is needed. Hence, the method may be carried out even when the marking functionality can not be implemented at the nodes of the communication network (e.g. nodes of different network operators).

According to a first aspect, the present invention provides a method for performing a performance measurement on a packet flow transmitted along a path through a packet switched communication network, the method comprising:
 a) generating a flow of artificial packets;
 b) aggregating the flow of artificial packets with the packet flow at a node of the communication network located along the path, so as to provide an aggregated packet flow which is transmitted along at least a length of the path starting from the node;
 c) at a first measurement point located along the length of the path, providing a first raw performance measurement indicative of actual positions of the artificial packets in the aggregated packet flow;
 d) at a second measurement point located along the length of the path, providing a second raw performance measurement indicative of actual positions of the artificial packets in the aggregated packet flow; and
 e) performing a performance measurement of the packet flow using the first and second raw performance measurements.

Preferably, step a) comprises configuring the artificial packets so that they are distinguishable from data packets of the packet flow by the first measurement point and by the second measurement point.

According to an advantageous variant, step a) comprises writing an identifier in each one of the artificial packets.

Preferably, step a) comprises writing a destination address in the artificial packets such that the artificial packets follow the at least a length the path of the packet flow starting from the node.

According to an advantageous variant, the artificial packets and data packets of the packet flow have a same format.

Preferably, step a) comprises generating the flow of artificial packets with a packet rate 1/Tb.

Preferably, step b) comprises aggregating the flow of artificial packets so that the artificial packets split the packet flow into a sequence of blocks of data packets, each artificial packet delimiting two consecutive blocks of data packets.

According to an advantageous embodiment, step c) is performed by the first measurement point at the same node at which aggregating is performed, the first raw performance measurement being indicative of actual positions of the artificial packets in the aggregated packet flow as transmitted by the same node at which the aggregating is performed.

Preferably, steps c) and d) comprise identifying each packet of the aggregated packet flow by applying an address filtering technique.

Preferably, each one of the steps c) and d) comprises identifying each artificial packet in the aggregated packet flow, and each one of providing the first raw performance measurement and providing the second raw performance measurement comprises providing, for each identified artificial packet, at least one of:
 a timestamp of the artificial packet;
 an artificial packet counter indicating a number of artificial packets;
 a data packet counter indicating a number of data packets included in a block of data packets terminated by the artificial packet; and
 a cumulative timestamp as a summation of timestamps of data packets included in a block of data packets terminated by the artificial packet.

Preferably, step e) comprises measuring at least one of:
 a one-way delay of each artificial packet;
 a jitter of the flow of artificial packets;
 a packet loss of the flow of artificial packets;
 a packet loss of the packet flow;
 an average one-way delay of each block of data packets of the packet flow;
 an average jitter of the packet flow; and
 a throughput of the packet flow.

According to a second aspect, the present invention provides a system for performing a performance measurement on a packet flow transmitted along a path through a packet switched communication network, the system comprising:
 a) an artificial packet generator configured to generate a flow of artificial packets;
 b) a packet aggregator implemented at a node located along the path and configured to aggregate the flow of artificial packets with the packet flow, so as to provide an aggregated packet flow which is transmitted along at least a length of the path starting from the node;
 c) a first measurement point located along the length of the path and configured to provide a first raw performance measurement indicative of actual positions of the artificial packets in the aggregated packet flow;
 d) a second measurement point located along the length of the path and configured to provide a second raw performance measurement indicative of actual positions of the artificial packets in the aggregated packet flow; and e) a management server configured to perform a performance measurement of the packet flow using the first and second raw performance measurements.

According to an advantageous embodiment, the first measurement point is implemented at the node after the packet aggregator.

According to a third aspect, the present invention provides a communication network comprising the system as set forth above.

According to a fourth aspect, the present invention provides a computer program product loadable in the memory of at least one computer and including software code portions for performing the steps of the method as set forth above, when the product is run on at least one computer.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
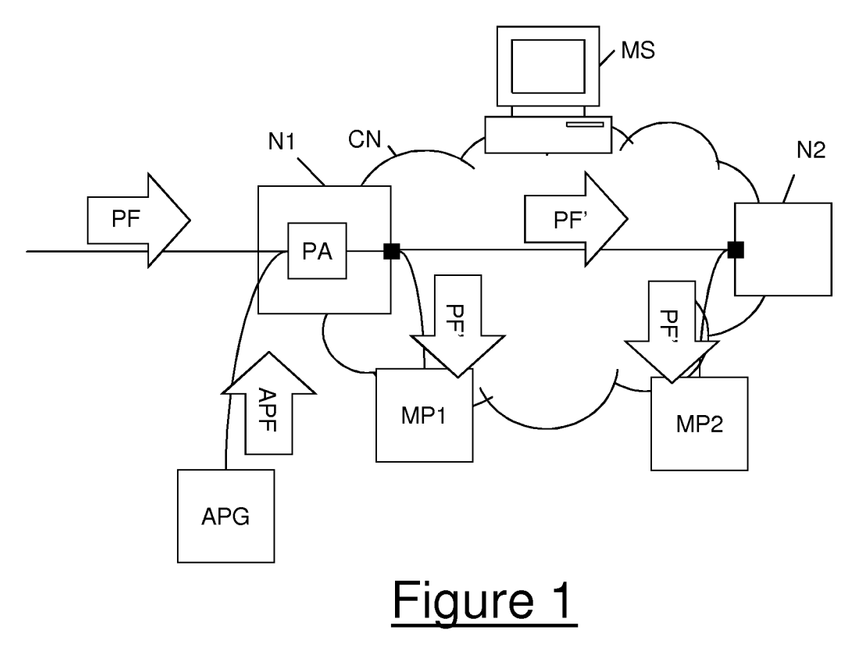
FIG. 1 schematically shows an exemplary packet-switched network where the performance method according to embodiments of the present invention is implemented.

FIG. 1 schematically shows an exemplary packet-switched communication network CN in which the method for performing a performance measurement according to embodiments of the present invention is implemented. The communication network CN may be an IP network, an Ethernet network, an MPLS network or any other known type of packet-switched communication network.

The communication network CN comprises a plurality of nodes reciprocally interconnected by links according to any known topology. In particular, the communication network CN comprises a first node N1 and a second node N2.

A packet flow PF is preferably transmitted from the first node N1 to the second node N2, possibly through intermediate nodes (not shown in FIG. 1) of the communication network CN. The first node N1 may be either the source node of the packet flow PF or an intermediate node of the path from the source node to the destination node. Similarly, the second node N2 may be either the destination node of the packet flow PF or an intermediate node of the path from the source node to the destination node. Further, the packet flow PF may comprise data packets generated by a same source node and addressed to a same destination node. Alternatively, the packet flow PF may be a "macro-flow" comprising data packets generated by different source nodes and/or addressed to different destination nodes, which only share a length of their paths between the first node N1 and the second node N2.

Preferably, each data packet of the packet flow PF comprises a header and a payload. The payload comprises user data. Besides, preferably, the header comprises information for routing the data packet. The header format depends on the protocol according to which the data packets are formatted.

Preferably, the communication network CN is provided with a management server MS. The management server MS may be either a stand-alone server connected to any of the nodes of the communication network CN. Alternatively, the management server MS may be implemented at any of the nodes of the communication network CN.

According to embodiments of the present invention, in order to implement a performance measurement on the packet flow PF, the communication network CN is provided with a generator of artificial packets APG configured to generate a flow of artificial packets APF. The generator APG may be implemented as a stand alone device connected to a node crossed by the packet flow PF, e.g. the node N1 as schematically depicted in FIG. 1. Alternatively, the generator APG may be embedded within a node crossed by the packet flow PF to be measured (e.g. the node N1). Alternatively, the generator APG may be implemented as a SW application possibly executed by a virtual machine (namely, by a shared HW not specifically dedicated to this purpose but used also for executing other network functionalities).

In any case, the artificial packets are preferably configured to follow through the communication network CN at least a length of the path of the packet flow PF, preferably starting from the node to which the generator APG is connected (or in which it is embedded), namely from N1 in the exemplary scenario of FIG. 1.

Further, the communication network CN is also preferably provided with a packet aggregator PA configured to aggregate the flow of artificial packets APF and the packet flow PF to be measured into an aggregated packet flow PF'. The packet aggregator PA is preferably implemented at the node to which the generator APG is connected (or in which it is embedded). In the exemplary scenario depicted in FIG. 1, the packet aggregator PA is accordingly implemented within the node N1.

Further, the communication network CN is also preferably provided with at least two measurement points MP1, MP2 located on the path length followed by the aggregated packet flow PF', downstream the packet aggregator PA. In FIG. 1, by way of non limiting example, two measurement points are shown: a first measurement point MP1 implemented at the first node N1 (namely, at the same node at which aggregation is carried out) and a second measurement point MP2 implemented at the second node N2. In particular, the first measurement point MP1 may be implemented at the output port of the first node N1 through which the aggregated packet flow PF' is transmitted to the second node N2, while the second measurement point MP2 may be implemented at the input port of the second node N2 through which the aggregated packet flow PF' is received from the first node N1, as depicted in FIG. 1.

Even though the following description refers to two measurement points only, this is not limiting and further measurement points may be provided on the path length followed by the aggregated packet flow PF', either between N1 and N2 or after N2. Further, even if it has been assumed that the first measurement point MP1 is implemented at the same node N1 where the aggregator PA is implemented, this is not limiting. According to other embodiments not shown in the drawings, all the measurement points may be implemented at nodes following N1 at which the aggregator PA is implemented.

Each measurement point MP1, MP2 may be either embedded within the respective node N1, N2, or implemented as a stand-alone machine connected to the respective node N1, N2. Independently of their implementation, the measurement points MP1, MP2 are preferably configured to identify the artificial packets in the aggregated packet flow PF' and to generate raw performance measurements, which will then be used (e.g. by the management server MS) for providing performance measurements relating to the packet flow PF.

The operation of the artificial packet generator APG, packet aggregator PA and measurement points MP1, MP2 will be described in further detail herein after.

As described above, the generator APG is configured to generate the flow of artificial packets APF. The artificial packets of the flow APF as generated by the generator APG are preferably configured to be identifiable by each measurement point MP1, MP2, namely to be distinguishable from the data packets of the packet flow PF by the measurement points MP1, MP2. Different techniques may be used for making the artificial packets identifiable by the measurement points MP1, MP2. According to a variant, the generator APG preferably marks the artificial packets, namely it sets one or more bits of their header to a value different from that of the data packets of the packet flow PF. According to another variant, generator APG writes an identifier in the payload of each artificial packet. The identifier may be either the same for all the artificial packets, in which case the identifier merely allows the measurement points MP1, MP2 distinguishing artificial packets from data packets. Alternatively, the identifier may be unique for each artificial packet (for instance, the identifier may comprise a sequence number), in which case a unique identification of each single artificial packet is enabled. According to a still further embodiment, the artificial packets may comprise in their header a dedicated source address or destination address, which enables the measurement points MP1, MP2 to identify the artificial packets by applying a suitable address filter.

Further, the destination address of the artificial packets is selected so that they follow the same path as the packet flow PF, at least for a length thereof starting from the node N1 at which aggregation was carried out. The destination address may be such that the artificial packets reach the same destination node as the packet flow PF. Alternatively, the destination address of the artificial packets may be such that the artificial packets are terminated on a probe, a server or any apparatus of the network manager.

According to advantageous embodiments, the artificial packets are configured to be indistinguishable from the data packets of the packet flow PF by the nodes of the communication network CN, at least along the path length followed by the packet flow PF aggregated with the flow of artificial packets APF. In particular, the generator APG preferably configures the artificial packets so that the nodes of the communication network CN treat them the very same way as the data packets of the packet flow PF, at least along the path length followed by the packet flow PF aggregated with the flow of artificial packets APF. This guarantees that the nodes of the communication network CN do not voluntarily change the sequence of data packets and artificial packets in the aggregated packet flow PF' due e.g. to a higher class of service of the data packets. Specifically, the artificial packets preferably have the same format as the data packets of the packet flow PF (e.g. Ethernet, IPv4, IPv6, etc.). Further, the artificial packets preferably have the same priority or class of service as the data packets of the packet flow PF.

According to alternative embodiments, the artificial packets may be e.g. packets as those used for the ping technique.

The artificial packet generator APG preferably generates the artificial packets with a certain packet rate 1/Tb. Preferably, the packet rate 1/Tb is independent of the packet rate of the packet flow PF to be measured and is preferably selected taking into account various factors, as it will be discussed in detail herein after.

Figures 2, 3:
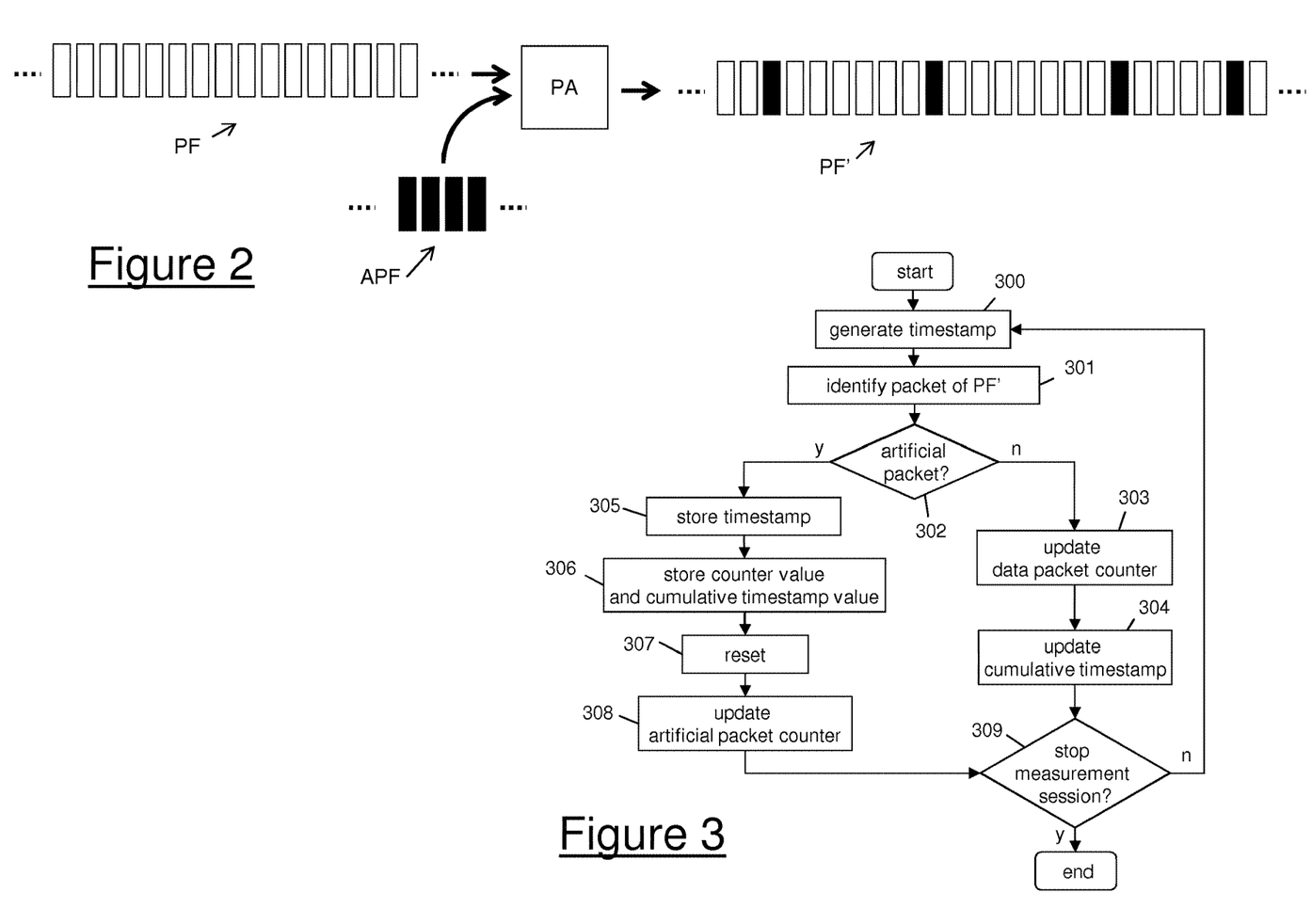
FIG. 2 schematically shows the operation of the packet aggregator according to embodiments of the present invention.
FIG. 3 is a flow chart of the operation of the measurement points according to embodiments of the present invention.

As mentioned above, the packet aggregator PA is configured to aggregate the packet flow PF with the flow of artificial packets APF, namely to insert or inject the artificial packets amongst the data packets of the packet flow PF so as to provide an aggregated packet flow PF', as schematically depicted in FIG. 2. The aggregator PA preferably inserts the artificial packets into the packet flow PF as it receives them from the artificial packet generator APG. The packet aggregator PA is advantageously not obliged to insert the artificial packets at predefined instants or predefined positions of the packet flow PF. The timeliness with which the packet aggregator PA inserts the artificial packets into the packet flow PF depends on the SW/HW resources available at the node N1 for implementing the aggregation function. In general, since the SW/HW resources are limited, the packet aggregator PA introduces a certain unpredictable delay between the time at which an artificial packet is received from the generator APG and the time at which the same artificial packet is inserted into the packet flow PF.

As shown in FIG. 2, the artificial packets basically split the packet flow PF into a sequence of blocks, each artificial packet delimiting two consecutive blocks of data packets. The number of data packets forming each block delimited by two consecutive artificial packets depends not only on the packet rate 1/Tb of the generator APG, but also on the unpredictable delay added by the aggregator PA and the packet rate of the packet flow PF. Statistically, a higher packet rate 1/Tb of the generator APG results in shorter blocks of data packets, while a lower packet rate 1/Tb of the generator APG results in longer blocks of data packets.

Hence, on one hand, a lower packet rate 1/Tb results in reduced computational effort by the measurement points MP1, MP2 and a lower bandwidth consumption in the communication network CN for gathering the raw performance measurements from the measurement points. Moreover, a lower packet rate 1/Tb reduces the risk of reception sequence errors involving the artificial packets, which errors would prevent properly correlating raw performance measurements generated by different measurement points for a same block of data packets. According to some variants, proper correlation of raw performance measurements relating to a same block of data packets is guaranteed by providing a unique identifier in each artificial packet (e.g. a sequence number in its payload, as mentioned above). According to other variants, the risk of improper correlation of raw performance measurements relating to different blocks of data packets is reduced by providing Tb much longer (at least one order of magnitude) than the potential mismatch of the clocks at the measurement points MP1, MP2, so as to minimize the risk of reception sequence errors involving the artificial packets.

On the other hand, however, a lower packet rate 1/Tb of the artificial packets reduces the granularity of the measurement results, which reflect more roughly the behaviour of the packet flow PF.

The packet rate 1/Tb applied by the generator APG is therefore tailored to balance the above trade-off, depending on the amount of available computational resources, the required measurement granularity and the probability of reception sequence errors in the communication network CN.

As mentioned above, the measurement points MP1, MP2 are preferably configured to identify the artificial packets in the aggregated packet flow PF' and to generate raw performance measurements, which will then be used (e.g. by the management server MS) for providing performance measurements relating to the packet flow PF.

More particularly, the measurement point MP1 preferably receives a copy of all traffic exiting the node N1 via the output port at which MP1 is implemented and, similarly, the measurement point MP2 preferably receives a copy of all traffic entering the node N2 via the input port at which MP2 is implemented.

With reference to the flow chart of FIG. 3, for each packet included in the copy of the received traffic, each measurement point MP1, MP2 preferably generates and stores a timestamp indicating the time at which the packet is received at the measurement point MP1, MP2 (step 300).

Then, each measurement point MP1, MP2 preferably identifies the packets (artificial packets and data packets) of the aggregated packet flow PF' in the copy of the received traffic (step 301), e.g. using an address filtering technique (source or destination address). Upon identification of each packet of the aggregated packet flow PF', each measurement point MP1, MP2 preferably stores only the timestamps relating to the artificial packets and data packets of the aggregated packet flow PF'. The other timestamps generated at step 300 are preferably discarded.

The measurement point MP1, MP2 then preferably determines whether the packet is an artificial packet or a data packet (step 302). As discussed above, the identification step 302 may be carried out by different known identification techniques (for example marking, identifier in the artificial packets' payload, source or destination address filtering).

If at step 302 the measurement point MP1, MP2 determines that the last identified packet is a data packet, it preferably increases a data packet counter (step 303) counting the number of data packets received at the measurement point MP1, MP2.

Further, if at step 302 the measurement point MP1, MP2 determines that the last identified packet is a data packet, it preferably uses the timestamp generated at step 300 for updating a cumulative timestamp (step 304). The cumulative timestamp updated at step 303 preferably is the summation of timestamps of data packets contained in the aggregated packet flow PF' as received at the measurement point MP1, MP2.

If at step 302 the measurement point MP1, MP2 instead determines that the packet is an artificial packet, it preferably stores the timestamp generated at step 300 (step 305), which therefore indicates the time at which the artificial packet is received at the measurement point MP1, MP2.

Further, if at step 302 the measurement point MP1, MP2 determines that the packet is an artificial packet, it preferably determines that a block of data packets is ended, and accordingly stores the current values of the counter and cumulative timestamp as updated at the last iteration of steps 303 and 304, respectively (step 306). The values of the counter and cumulative timestamp are then preferably reset (step 307).

Further, if at step 302 the measurement point MP1, MP2 determines that the packet is an artificial packet, it preferably increases an artificial packet counter counting the number of artificial packets received at the measurement point MP1, MP2 (step 308).

Hence, by iterating steps 305-308 for each identified artificial packet until the end of the measurement session (step 309), each measurement point MP1, MP2 provides a timestamp, an artificial packet counter value, a data packet counter value and a cumulative timestamp value for each identified artificial packet. In particular, the measurement point MP1 preferably provides, for each identified artificial packet:

(i) a transmission timestamp $T1(k)$ indicating the time at which the artificial packet $k^{th}$ has been transmitted by the node N1; and/or (ii) a transmission artificial packet counter $AC1(k)$ indicating the number of artificial packets which has been transmitted by the node N1; and/or (iii) a transmission data packet counter $C1(k)$ indicating the number of data packets which form the block terminated by the artificial packet $k^{th}$ as transmitted from the node N1; and/or (iv) a cumulative transmission timestamp $CT1(k)$ which is the summation of the transmission times from the node N1 of the data packets which form the block terminated by the artificial packet $k^{th}$.

Similarly, the measurement point MP2 preferably provides, for each identified artificial packet:

(i) a reception timestamp $T2(k)$ indicating the time at which the artificial packet $k^{th}$ has been received at the node N2; and/or (ii) a reception artificial packet counter $AC2(k)$ indicating the number of artificial packets which has been received by the node N2; and/or (iii) a reception data packet counter $C2(k)$ indicating the number of data packets which form the block terminated by the artificial packet $k^{th}$ as received at the node N2; and/or (iv) a cumulative reception timestamp $CT2(k)$ which is the summation of the reception times at the node N2 of the data packets which form the block terminated by the artificial packet $k^{th}$.

If each artificial packet comprises also a unique identifier (e.g. an identifier comprising a serial number in its payload, as mentioned above), each measurement point MP1, MP2 also associates such unique identifier to the timestamp, artificial packet counter value, data packet counter value and cumulative timestamp stored for each identified artificial packet.

It shall be noticed that all the raw performance measurements provided by the measurement points MP1, MP2 according to the flow chart of FIG. 3 reflect the actual features of the aggregated packet flow PF'.

In particular, the timestamps relating to the artificial packets as transmitted by the node N1 reflect the actual transmission times of the artificial packets from the node N1, since such timestamps are generated only after the artificial packets have been inserted into the packet flow PF. Hence, even if the packet aggregator PA introduces an unpredictable delay—as discussed above—between the time at which an artificial packet is received from the generator APG and its actual transmission time, this does not impair the accuracy of the time (delay and jitter) measurements, since this measurement is based on a transmission timestamp which reflects the real behaviour of the artificial packet, not the expected one. The performance measurement results are therefore accurate even if the packet aggregator PA does not precisely insert the artificial packets every Tb time units or every Nb packets.

As mentioned above, the raw performance measurements provided by the measurement points MP1, MP2 are used (e.g. by the management server MS) for providing performance measurements relating to the packet flow PF. To this purpose, the measurement points MP1, MP2 preferably send the raw performance measurements $T1(k)$, $C1(k)$, $CT1(k)$ and $T2(k)$, $C2(k)$, $CT2(k)$ to the management server MS. The raw performance measurements may be sent during dedicated communication sessions between measurement points MP1, MP2 and management server MS, or within the payload of artificial packets sent from the measurement points MP1, MP2 to the management server MS.

Starting from those raw performance measurements, the management server MS preferably provides one or more of the following performance measurements:

(i) one-way delay measurement of the artificial packet $k^{th}$ as:

$$OWD(k)=T2(k)-T1(k);$$

(ii) jitter measurement of the artificial packets as, for instance:

$$J(k)=OWD(k)-OWD(k-1);$$

(iii) packet loss measurements of the flow of artificial packets APF as:

$$APL(k)=AC1(k)-AC2(k);$$

(iv) packet loss measurement in the block of data packets terminated by the artificial packet $k^{th}$ as:

$$PL(k)=C1(k)-C2(k);$$

(v) average one-way delay measurement of the block of data packets terminated by the artificial packet $k^{th}$ as (valid only in absence of packet loss):

$$AOWD(k)=\frac{CT2(k)}{C2(k)}-\frac{CT1(k)}{CT(k)};$$

(vi) average jitter for data packets as, for instance:

$$AJ(k)=AOWD(K)-AOWD(k-1);$$

(vii) throughput of the data packets as:

$$THR(k)=C2(K)/(T2(k)-T2(k-1)).$$

It may be noticed that the packet rate 1/Tb of the artificial packet generator APG affects the throughput, but not in a deterministic way, since it also depends on the real traffic. Further, the above throughput formula provides a measurement in terms of packets/second. If a measurement is needed e.g. in terms of byte/second, the measurement points shall also provide byte counters whose values are calculated based on the number of received packets and the number of bytes in each packet.

As discussed above, these performance measurements are advantageously accurate without requiring precise insertion of the artificial packets in the packet flow PF.

According to some variants, the flow of artificial packets APF may also be used for continuous test of the link between the nodes N1 and N2 in the absence of real traffic. In order to perform such continuous test, the generator APG generates an artificial packet every Tb time units, so that— even in the absence of real traffic—the artificial packets are transmitted substantially periodically from node N1.

In the above description, reference has been made to a scenario where two measurement points MP1, MP2 are present, which provide respective raw performance measurements enabling end-to-end performance measurements between the nodes N1 and N2. This is not limiting. According to other scenarios, three or more measurements points may be provided on the path length followed by the aggregated packet flow PF', which provide respective raw performance measurements. Those raw performance measurements enable both end-to-end measurements (between the first and last measurement points) and partial measurements (between consecutive measurement points).

It shall also be noticed that the above described performance measurement is inherently unidirectional, namely it provides performance measurements relating to transmission from a certain node (N1) to another node (N2). In order to provide performance measurement also for the opposite direction (from N2 to N1), a further artificial packet generator and a further packet aggregator shall be provided, which generate a further flow of artificial packets and aggregate them, e.g. at the node N2, with a further packet flow transmitted from node N2 to node N1. This will be described in further detail herein after, with reference to an exemplary scenario of a fixed access network.

Herein after, some exemplary scenarios wherein the performance measurement according to embodiments of the present invention may be implemented will be described.

Figure 4A:
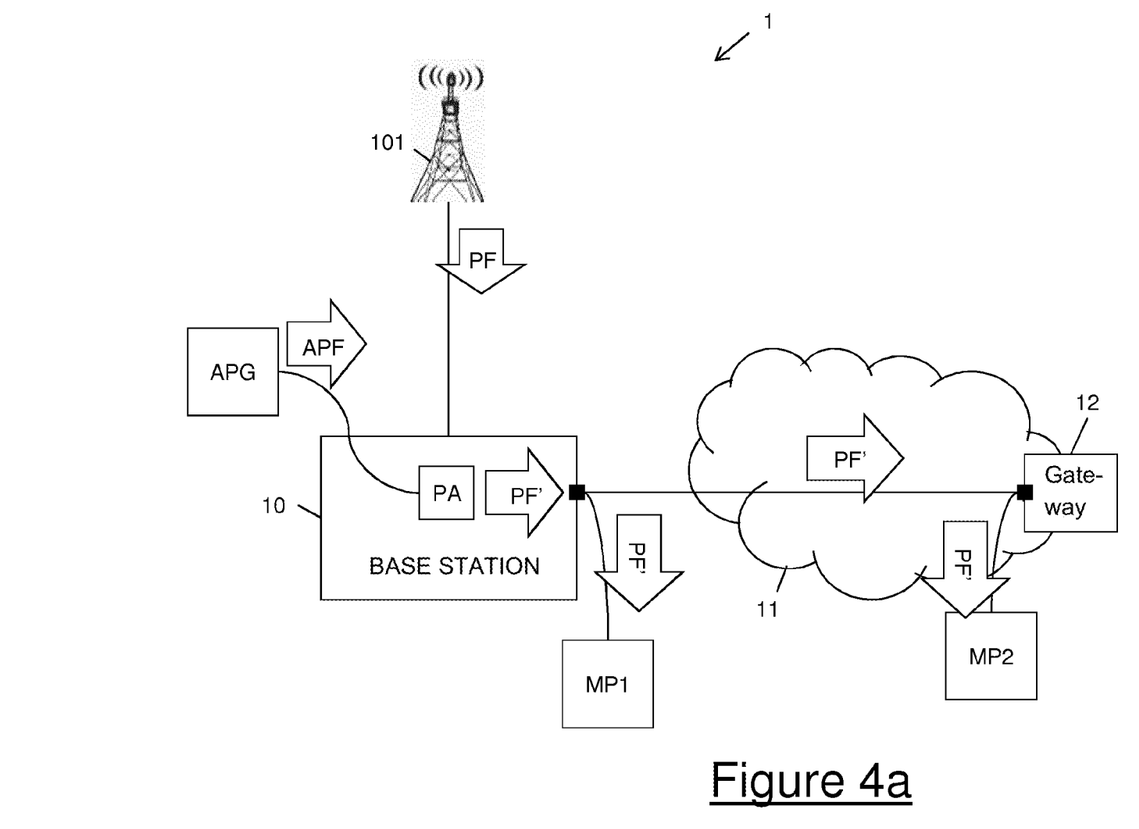
FIGS. 4a and 4b show exemplary applications of the performance measurement method in a mobile communication system.
Figure 4B:
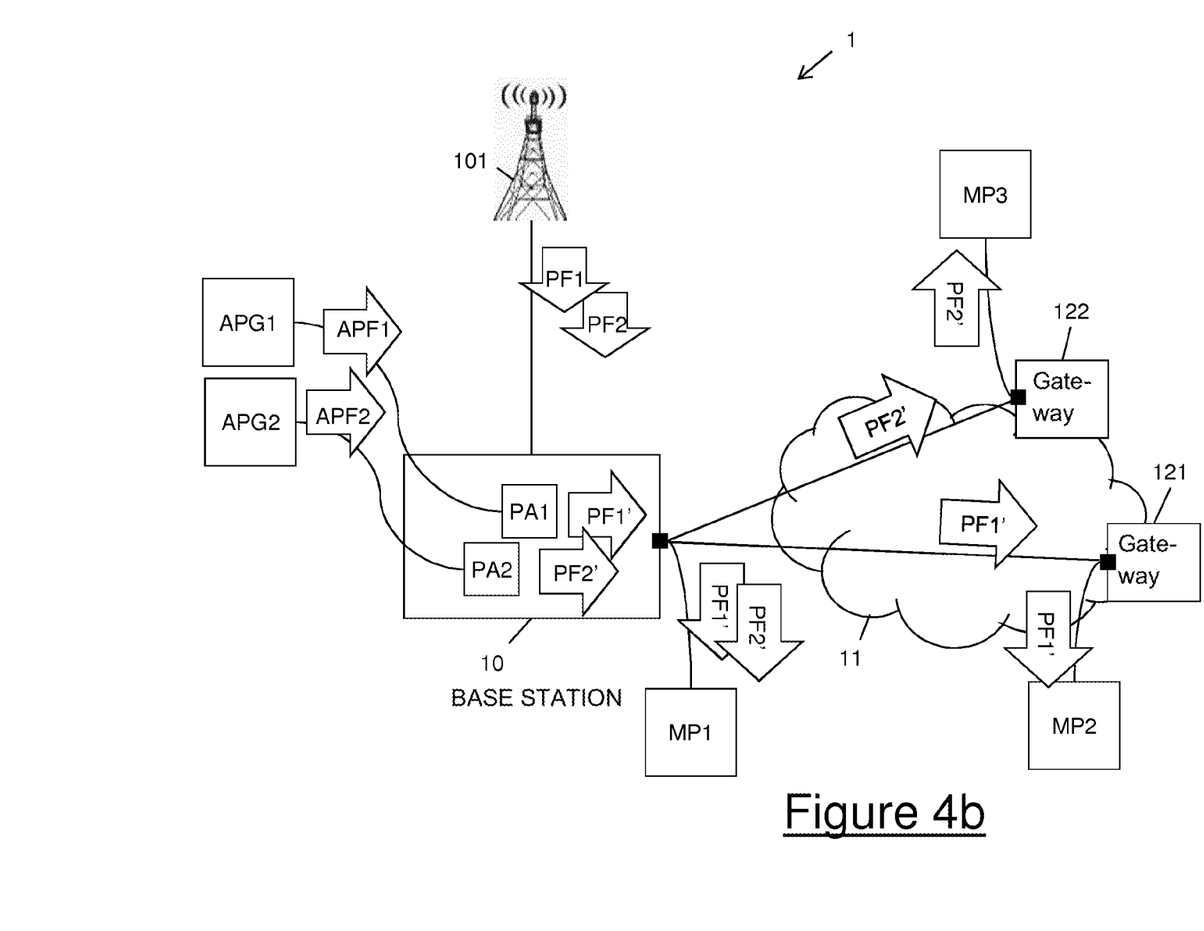

FIGS. 4a and 4b show a first exemplary scenario, where the performance measurement according to embodiments of the present invention is implemented in a mobile communication system 1, for instance a LTE (Long Term Evolution) system.

The mobile communication system 1 comprises a number of base stations (a single base station 10 is shown in FIG. 4a), a backhauling network 11 and one or more packet gateways (a single gateway 12 is shown in FIG. 4a). The base station 10 is preferably connected to the packet gateway 12 via the backhauling network 11. The packet gateway 12 in turn connects the backhauling network 11 with a network (not shown in FIG. 4), which may comprise the core network of the mobile communication system 1 and/or an IP backbone and/or an IP network.

The base station 10 is preferably provided with an antenna system 101 which provides coverage to one or more cells. In particular, the antenna system 101 gathers upstream traffic from user terminals located within its cell(s) and merges them in one or more packets flows (a single packet flow PF, in this first example). The base station 10 performs a conversion of the radio frequency signal carrying the packet flow PF from radio frequency domain to baseband domain, performs its baseband processing and then sends the packet flow PF to the packet gateway 12 via the backhauling network 11.

In order to measure the performance of the packet flow PF according to embodiments of the present invention, an artificial packet generator APG and a packet aggregator PA as described above are preferably provided. Preferably, the packet aggregator PA is implemented in the base station 10 so as to aggregate the artificial packets of the flow APF generated by the generator APG and the packet flow PF into an aggregated packet flow PF', which is then sent to the packet gateway 12.

Further, two measurement points MP1, MP2 are preferably implemented on the path of the aggregated packet flow PF'. For instance, a first measurement point MP1 is preferably implemented at the base station 10, while a second measurement point MP2 is preferably implemented at the packet gateway 12, as shown in FIG. 4a. The operation of the measurement points MP1, MP2 is as described above. Hence, the measurement points MP1, MP2 provide raw performance measurements (counters and/or timestamps) allowing to measure the performance of the packet flow PF between the base station 10 and the packet gateway 12.

Since, in general, other packet flows are transmitted in the radio access system 1 between the base station 10 and the packet gateways, in order to implement the performance measurement method the measurement points MP1, MP2 preferably filter out the aggregated packet flow PF' from the other packet flows, e.g. using an address filter (source address or destination address).

In FIG. 4a, performance measurement of a single packet flow PF is shown. However, as mentioned above the performance measurement method described above may be applied to different packet flows in the same communication network, as shown in FIG. 4b.

FIG. 4b shows a mobile communication system similar to that of FIG. 4a, comprising at least two packet gateways 121 and 122. The antenna system 101 gathers the upstream traffic from user terminals located within its cell(s) and merges them in at least two different packet flows PF1, PF2. The base station 10 performs a conversion of the radio signals carrying the packet flows PF1, PF2 from radio frequency domain to baseband domain, performs their baseband processing and then sends the packet flows PF1, PF2 to the packet gateways 121, 122, respectively, via the backhauling network 11.

In order to measure the performance of the packet flows PF1, PF2, according to embodiments of the present invention, two artificial packet generators APG1, APG2 generate two flows of artificial packets APF1, APF2. Then, two packet aggregators PA1, PA2 implemented at the base station 10 preferably aggregate APF1 and PF1 into an aggregated packet flow PF1' and aggregate APF2 and PF2 into an aggregated packet flow PF2'. The base station 10 then transmits the aggregated packet flows PF1', PF2' to the packet gateways 121, 122 respectively.

Further, a first measurement point MP1 is implemented at the base station 10, a second measurement point MP2 is implemented at the packet gateway 121 and a third measurement point MP3 is implemented at the packet gateway 122. The measurement points MP1, MP2 provide raw performance measurements relating to the aggregated packet flow PF1', while the measurement points MP1, MP3 provide raw performance measurements relating to the aggregated packet flow PF2'.

Since, in general, other packet flows are transmitted in the radio access system 1 between the base station 10 and the packet gateways, in order to implement the performance measurement method the measurement points MP1, MP2, MP3 preferably filter out the aggregated packet flows PF1', PF2' from the other packet flows, e.g. using an address filter.

More generally, the performance method may be applied for measuring any number of packet flows. Indeed, independently of the number of packet flows to be measured, the method may be implemented by providing a packet generator, a packet aggregator and at least two measurement points for each packet flow to be measured. If two or more packet flows to be measured have at least partially overlapping paths, their generators and/or their aggregators and/or their measurement points may be co-located or even integrated in a same device.

Figure 5A:
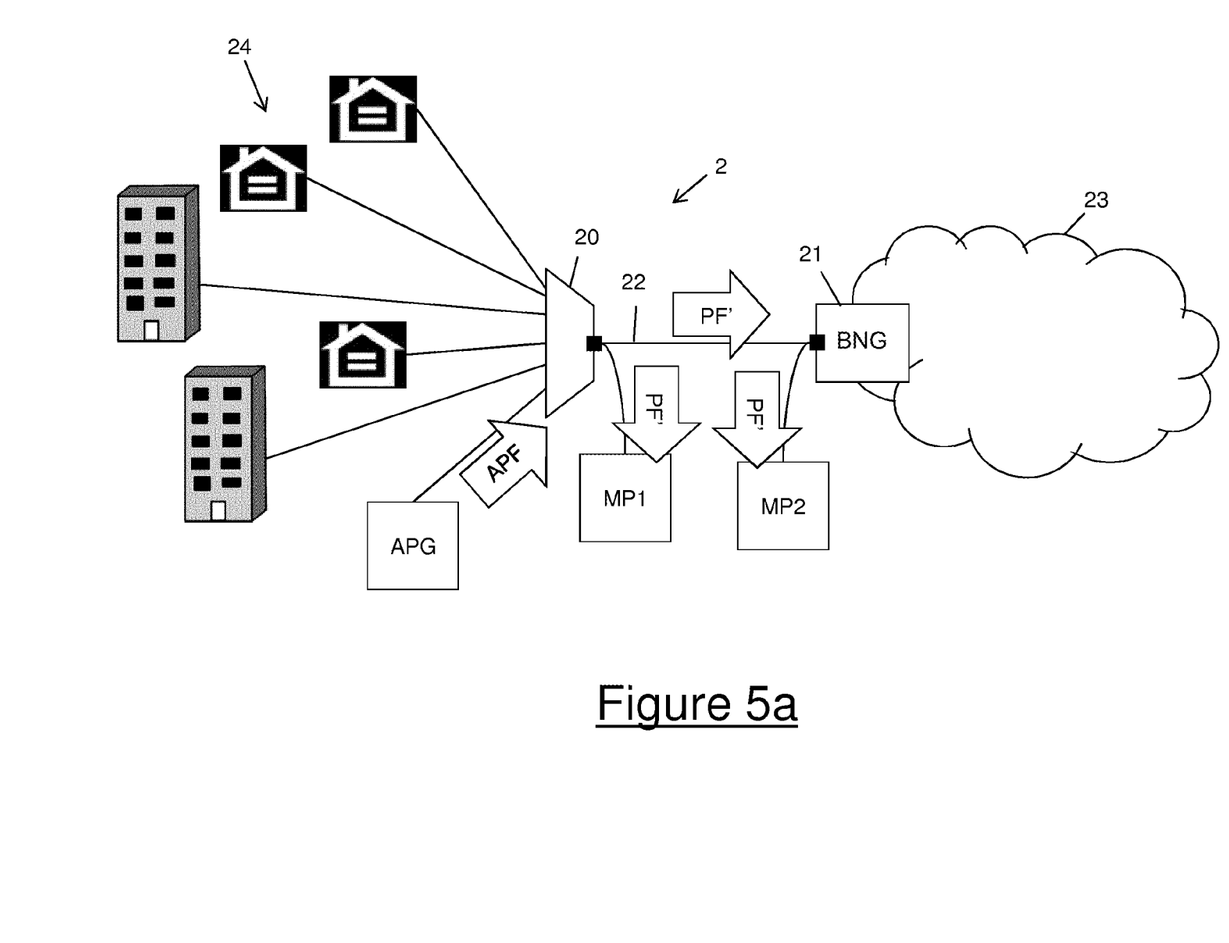
FIGS. 5a and 5b show exemplary applications of the performance measurement method in a fixed access network.
Figure 5B:
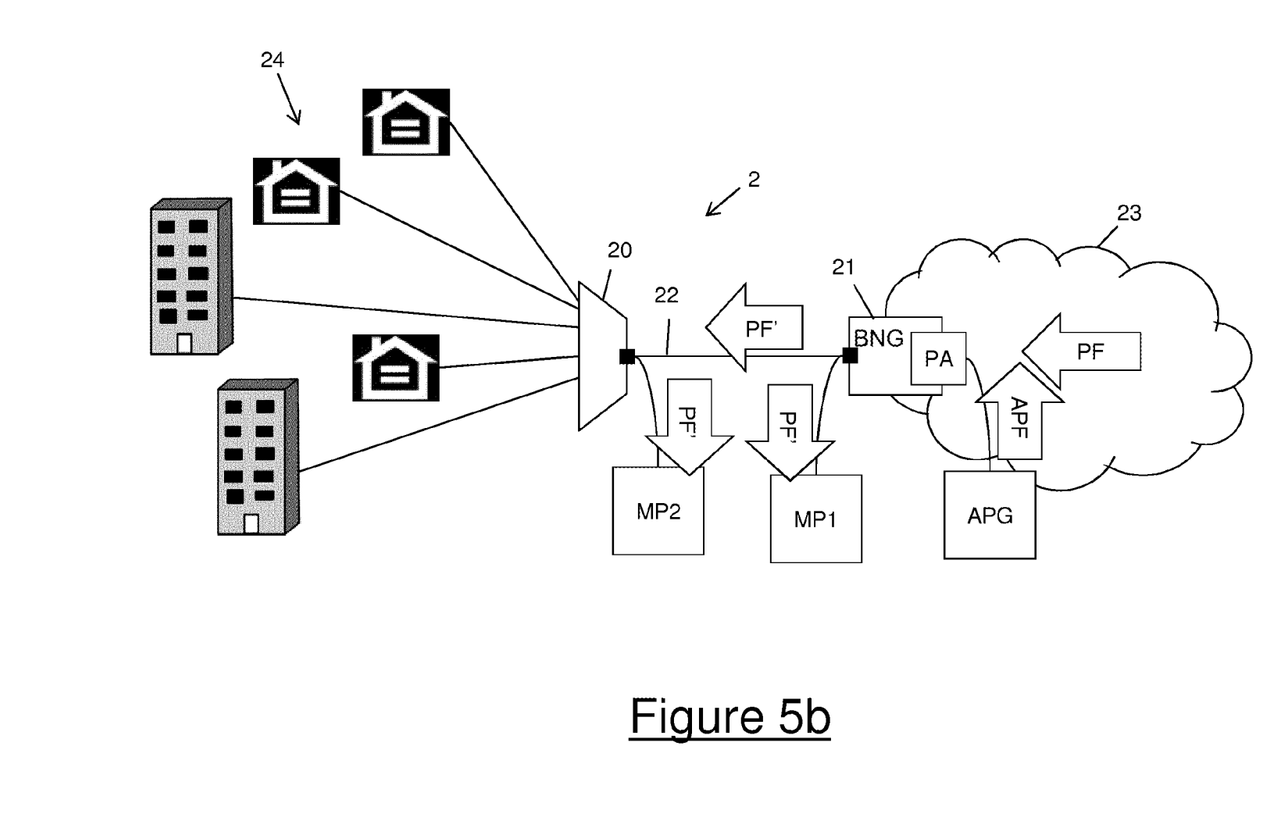

FIGS. 5a and 5b show a second exemplary scenario, where the performance measurement according to embodiments of the present invention is implemented in a fixed access network 2, for instance a DSL (Digital Subscriber Line) network.

The fixed access network 2 preferably comprises a DSLAM (DSL Access Multiplexer) 20 and a BNG (Broadband Network Gateway) 21 connected to the DSLAM 20 via a transport link 22 (e.g. an Ethernet link) and connecting the fixed access network 2 to a core network 23. The DSLAM 20 has a number of user side ports connected to end user devices 24 via respective subscriber lines.

With reference first to FIG. 5a, in the uplink direction the DSLAM 20 receive upstream data packets from the end users 24 and multiplexes them in a single upstream packet flow PF, which is then sent to the BNG 21 via the transport link 22.

In order to measure the performance of the fixed access network 2 in the uplink direction, an artificial packet generator APG as described above is preferably connected to one of the user-side ports of the DSLAM 20. The DSLAM 20 itself acts as a packet aggregator, which aggregates the artificial packet flow APF generated by the generator APG with the upstream packets from the end users into an aggregated packet flow PF', which is then sent to the BNG 21.

Further, two measurement points MP1, MP2 are preferably implemented on the path of the aggregated packet flow PF'. For instance, a first measurement point MP1 is preferably implemented at the network-side port of the DSLAM 20, while a second measurement point MP2 is preferably implemented at user-side port of the BNG 21 receiving the aggregated packet flow PF'. The operation of the measurement points MP1, MP2 is as described above. Hence, the measurement points MP1, MP2 provide raw performance measurements (counters and/or timestamps) allowing to measure the performance of the fixed access network 2 from the DSLAM 20 to the BNG 21.

With reference now to FIG. 5b, in the downlink direction the BNG 21 receives a packet flow PF from the core network 23, which comprises downstream data packets addressed to the end users 24. The packet flow PF is sent to the DSLAM 20, which demultiplexes it and sends each downstream data packet to the respective end user.

In order to measure the performance of the fixed access network 2 in the downlink direction, an artificial packet generator APG as described above is preferably connected to the BNG 21. A packet aggregator PA is then implemented in the BNG 21, which aggregates the artificial packet flow APF generated by the generator APG with the downstream packet flow PF into an aggregated packet flow PF', which is then sent to the DSLAM 20. At the DSLAM 20, the artificial packets are separated from the data packets of the packet flow PF. Then, the artificial packets may be terminated at the DSLAM 20, or they may be sent to a device (not shown in the drawings) connected to the user side of the DSLAM 20 and managed by the network manager. Alternatively, the artificial packets may be sent to any one of the end user 24 cooperating with the network manager.

Further, two measurement points MP1, MP2 are preferably implemented on the path of the aggregated packet flow PF'. For instance, a first measurement point MP1 is preferably implemented at the user-side port of the BNG 21 transmitting the aggregated packet flow PF', while a second measurement point MP2 is preferably implemented at network-side port of the DSLAM 20. The operation of the measurement points MP1, MP2 is as described above. Hence, the measurement points MP1, MP2 provide raw performance measurements (counters and/or timestamps)

allowing to measure the performance of the fixed access network 2 from the BNG 21 to the DSLAM 20.

Hence, the performance measurement method according to embodiments of the present invention may be advantageously applied to any type of packet switched network, wherein it provides accurate results without requiring the precise insertion of artificial packets into predefined position of a packet flow and without requiring any marking of the data packets.

The invention claimed is:

1. A method for performing a performance measurement on a packet flow of data packets transmitted along a path through a packet switched communication network, the packet flow carrying user traffic, the method comprising:
   a) generating a flow of artificial packets that do not carry user traffic, the flow of artificial packets being generated with a packet rate set according to a desired measurement granularity;
   b) after generating the flow of artificial packets, aggregating the flow of artificial packets with the packet flow at a node of the communication network located along the path, to provide an aggregated packet flow which is transmitted along at least a length of the path starting from the node;
   c) at a first measurement point located along the length of the path downstream of said aggregating, distinguishing the artificial packets from the other packets of the aggregated packet flow based on address filtering and providing a first raw performance measurement indicative of actual positions of the artificial packets relative to other packets in the aggregated packet flow;
   d) at a second measurement point located along the length of the path and downstream of said aggregating and said first measurement point, distinguishing the artificial packets from the other packets of the aggregated packet flow based on address filtering and providing a second raw performance measurement indicative of actual positions of the artificial packets relative to other packets in the aggregated packet flow; and
   e) performing a performance measurement of the packet flow using the first and second raw performance measurements,
   wherein a) comprises configuring the artificial packets to be distinguishable from the other data packets of the aggregated packet flow by the first measurement point and the second measurement point based on address filtering, the artificial packets comprising in their header a dedicated source address or a destination address enabling the first measurement point and the second measurement point to distinguish the artificial packets from the other packets of the aggregated packet flow based on address filtering.

2. The method according to claim 1, wherein a) comprises writing an identifier in each one of the artificial packets.

3. The method according to claim 1, wherein a) comprises writing the destination address in the artificial packets such that the artificial packets follow the at least a length of the path of the packet flow starting from the node.

4. The method according to claim 1, wherein the artificial packets and data packets of the packet flow have a same format.

5. The method according to claim 1, wherein b) comprises aggregating the flow of artificial packets so that the artificial packets split the packet flow into a sequence of blocks of data packets, each artificial packet delimiting two consecutive blocks of data packets.

6. The method according to claim 5, wherein each one of c) and d) comprises identifying each artificial packet in the aggregated packet flow, and wherein each one of the providing the first raw performance measurement and the providing the second raw performance measurement comprises providing, for each identified artificial packet, at least one of:
   a timestamp of the artificial packet;
   an artificial packet counter indicating a number of artificial packets;
   a data packet counter indicating a number of data packets included in a block of data packets terminated by the artificial packet; or
   a cumulative timestamp as a summation of timestamps of data packets included in a block of data packets terminated by the artificial packet.

7. The method according to claim 6, wherein e) comprises measuring at least one of:
   a one-way delay of each artificial packet;
   a jitter of the flow of artificial packets;
   a packet loss of the flow of artificial packets;
   a packet loss of the packet flow;
   an average one-way delay of each block of data packets of the packet flow;
   an average jitter of the packet flow; or
   a throughput of the packet flow.

8. The method according to claim 1, wherein c) is performed by the first measurement point at the node at which the aggregating is performed, the first raw performance measurement being indicative of actual positions of the artificial packets relative to the other packets in the aggregated packet flow as transmitted by the node at which the aggregating is performed.

9. The method according to claim 1, wherein each one of c) and d) comprises identifying each packet of the aggregated packet flow by applying an address filtering.

10. A non-transitory computer readable medium including a computer program product loaded in a memory of at least one computer and including software code portions for performing the method of claim 1, when the product is run on at least one computer.

11. The method according to claim 1, wherein the packet rate of the flow of artificial packets is different than a packet rate of the flow of data packets.

12. The method according to claim 1, wherein the packet rate of the flow of artificial packets is further set based on a clock mismatch between the first and second measurement points.

13. The method according to claim 1, wherein the packet rate of the flow of artificial packets is further set based on a probability of reception errors.

14. A system for performing a performance measurement on a packet flow of data packets transmitted along a path through a packet switched communication network, the packet flow including user traffic, the system comprising:
   a) an artificial packet generator configured to generate a flow of artificial packets that do not include user traffic, the flow of artificial packets being generated with a packet rate set according to a desired measurement granularity;
   b) a packet aggregator implemented at a node located along the path and configured to aggregate the flow of artificial packets generated by the artificial packet generator with the packet flow, to provide an aggregated packet flow which is transmitted along at least a length of the path starting from the node;

c) a first measurement point located along the length of the path downstream of the packet aggregator and configured to distinguish the artificial packets from the other packets of the aggregated packet flow based on address filtering and provide a first raw performance measurement indicative of actual positions of the artificial packets relative to other packets in the aggregated packet flow;

d) a second measurement point located along the length of the path downstream of the first measurement point and configured to distinguished the artificial packets from the other packets of the aggregated packet flow based on address filtering and provide a second raw performance measurement indicative of actual positions of the artificial packets relative to other packets in the aggregated packet flow; and e) a management server configured to perform a performance measurement of the packet flow using the first and second raw performance measurements, wherein the artificial packet generator is configured to configure the artificial packets to be distinguishable from the other packets in the aggregated packet flow by the first measurement point and the second measurement point based on address filtering, the artificial packets comprising in their header a dedicated source address or a destination address enabling the first measurement point and the second measurement point to distinguish the artificial packets from the other packets in the aggregated packet flow based on address filtering.

15. The system according to claim 14, wherein the first measurement point is implemented at the node after the packet aggregator.

16. The system according to claim 14, wherein the system is included in the packet switched communication network.

* * * * *